Oct. 29, 1935.  N. F. MILLER  2,018,799
LICENSE PLATE IDENTIFICATION MEANS
Filed Dec. 4, 1934
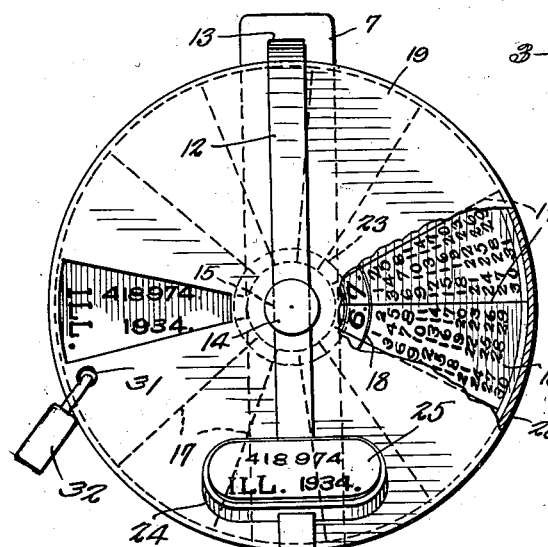
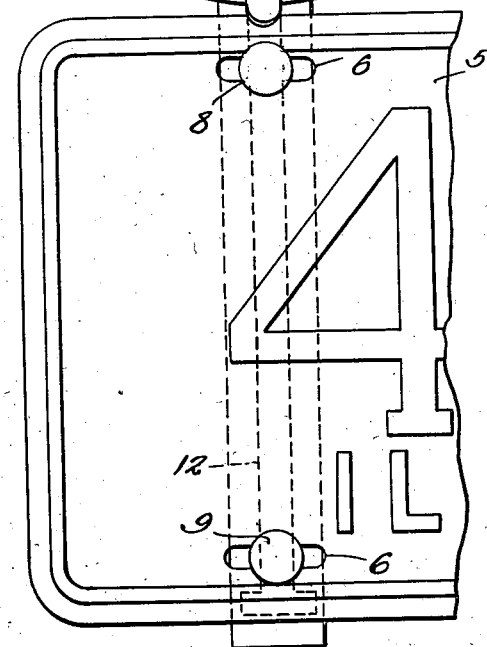
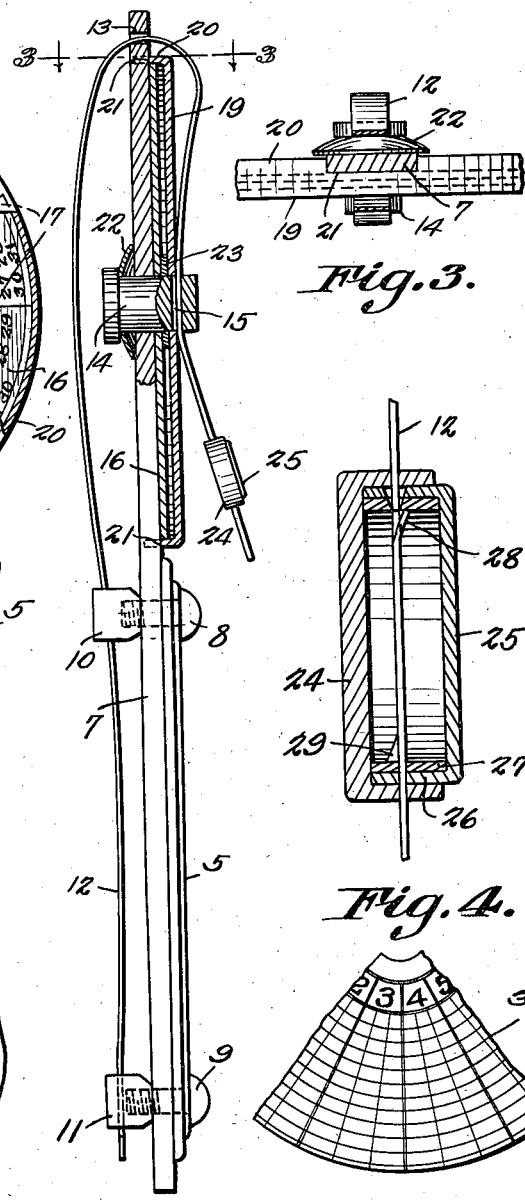
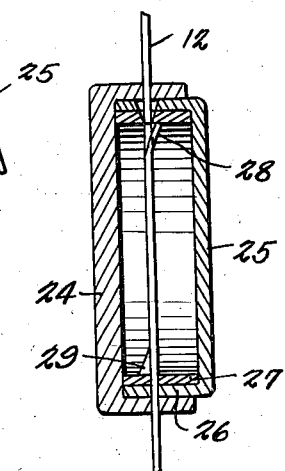
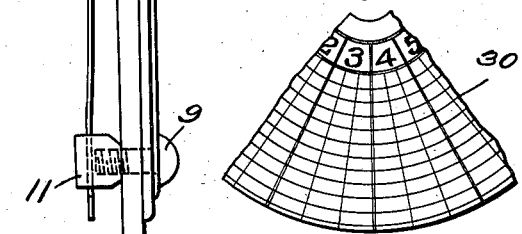
Fig. 1.    Fig. 2.    Fig. 5.
Inventor
N. F. Miller
By C. A. Snow & Co.
Attorneys.

Patented Oct. 29, 1935

2,018,799

UNITED STATES PATENT OFFICE 2,018,799

LICENSE PLATE IDENTIFICATION MEANS

Nickolaus F. Miller, Dwight, Ill.

Application December 4, 1934, Serial No. 755,967

3 Claims. (Cl. 40—2.2)

This invention relates to motor vehicle license plates, and aims to provide means whereby violations of traffic regulations may be accurately recorded and the driver's record may be readily ascertained at all times, for the convenience of traffic officers.

An important object of the invention is to provide a device of this character which may be readily and easily mounted on the usual motor vehicle license plate eliminating the necessity of making alterations in the license plate construction to apply the device.

A further object of the invention is to construct a device of this character which may be secured in position in such a way that the removal of the device by unauthorized persons will be made impossible without detection.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a fragmentary elevational view of a license plate equipped with a device constructed in accordance with the invention.

Figure 2 is an end elevational view of a license plate with the device attached, the device being shown in section.

Figure 3 is a sectional view taken on line 3—3 of Figure 2.

Figure 4 is a vertical sectional view through the seal portion of the device.

Figure 5 is a fragmentary view illustrating a modified form of record disk.

Referring to the drawing in detail, the reference character 5 designates a motor vehicle license plate, which is of the usual and well-known construction, the license plate being provided with elongated openings 6 by means of which the plate is usually secured to a supporting bracket.

The device embodies a bar 7 formed with openings adapted to register with the openings 6 so that the securing bolts 8 and 9 may be passed therethrough, the bolt 8 being provided with a nut 10 for drawing the plate and bar together. The nut 11 which is positioned on the threaded end of the bolt 9 is of substantially the same construction as nut 10. These nuts 10 and 11 are formed with slots for the reception of the seal strap 12 which is threaded through the slots of the nuts 10 and 11, from the lower sides of the nuts, the seal strap passing upwardly and through the slot 13 formed adjacent to the upper end of the bar 7.

The strap 12 has its lower end formed T shaped, so that the strap will be securely held within the slot of the nut 11, against upward movement, through the slot.

An opening is formed in the bar 7, at a point in spaced relation with the upper end of the bar, for the reception of the pivot pin 14, which is in the form of a headed bolt provided with a slot 15, through which the upper end of the strap 12 is passed when the device has been positioned and sealed.

Mounted for rotary movement on the pivot pin 14 is a record disk 16 which is provided with lines 17 radiating from the center of the disk, the lines providing spaces for the reception of indicia representing the days of the months of the year. A line 18 encircles the pivot pin 14 in spaced relation therewith, crossing the lines 17 at the inner ends thereof, and providing spaces for the reception of indicia representing the months of the year. A cover disk 19 is also mounted on the pivot pin 14 and is formed with a rearwardly extended annular flange 20, the flange contacting with the periphery of the record disk 16 providing a housing for the record disk. Cut-out portions 21 are formed in the flange 20, and are so arranged that they will permit the disk 19 to fit over the bar 7 securing the disk 19 against rotary movement.

A spring washer 22 is positioned on the pivot pin 14 and is disposed between the head thereof and the bar 7 to the end that the pivot pin 14 is held against movement, under normal conditions and the disks 16 and 19 are secured against vibrating to cause objectionable noise. In order that the disks 16 and 19 will be held in proper spaced relation with each other, a spacing disk 23 is provided and placed between the disks 16 and 19.

As clearly shown by Figure 2 of the drawing the strap 12 is passed through the slot of the pivot pin 14, after it has been passed through the slot 13, where the strap is supplied with a seal. The seal, which is indicated more clearly by Figure 4 of the drawing, embodies a casing 24 which is provided with slots through which the free end of the strap is extended. The casing also includes a cover 25 having an inturned flange 26, the flange 26 being also provided with openings registering with the openings in the casing 24.

Within the cover 25 is a band 27 which is also formed with openings registering with the openings of the casing and flange 26. Thus it will be seen that when the seal is positioned, the casing is passed over the free end of the strap. Tongues 28 and 29 are cut from the sides of the strap 12, and are bent laterally so that when the strap is being positioned through the openings of the casing, the tongues will move inwardly, and when the casing has been properly positioned, the tongues will spring outwardly contacting with the band 27, securely locking the seal in position so that the seal can only be removed by destroying the seal, which of course would indicate that the seal and record had been tampered with by unauthorized persons.

The seal will be provided with indicia corresponding to the indicia of the license plate with which the device is used, making it impossible to use the device with license plates other than the one for which the device has been issued.

It might be further stated that the disk 19 is formed with a cut-out portion so that the indicia of the disk 16 may be viewed therethrough.

In order to further prevent interchanging of the device with license plates other than the one for which the device has been issued, the disk 16 is provided with indicia representing the number, date, and State issuing the license.

The record disk 16 and cover disk 19 are provided with registering openings 31 for the reception of the padlock 32, whereby the disks are locked in their normal positions, as shown by Figure 1 of the drawing.

In the modified form of the invention as shown by Figure 5 of the drawing, the disk 30 is provided with lines dividing the surface thereof into a plurality of spaces representing days of the month, while at the ends of these spaces are provided indicia indicating the months of the year.

In the use of the device it is contemplated to provide suitable indicating means such as a punch for punching any number desired, to indicate the day of the month on which a traffic regulation was violated. In other words if a motor vehicle operator is stopped by a traffic officer the traffic officer will turn the disk 16 until the indicia representing the day of the month on which the traffic regulation was violated appears under the cut-out portion of the disk 19, whereupon the date may be punched or stamped. It will thus be seen that should this same operator again be stopped by a traffic officer for violating a traffic regulation, the officer may by rotating the disk 16, observe the prior traffic law violation and act accordingly.

Having thus described the invention what is claimed is:

1. A record device comprising a supporting bar adapted to be secured to a motor vehicle license plate, a record disk pivotally mounted on the bar, a cover disk having a rearwardly extended annular flange adapted to substantially house the record disk, said cover disk having an opening through which the record disk may be viewed, means for securing the bar to a license plate, said means including a seal strap and seal adapted to also prevent removal of the record disk from the bar.

2. A record device comprising a supporting bar having a slot adapted to be secured to a motor vehicle license plate, a pivot pin mounted on the bar and having a slot, a rotatable record disk mounted on the pivot pin, a cover disk covering the record disk and mounted on the pin, a strap having one of its ends secured to the bar, said strap passing through the slot of the bar and over the disk and through the slot of the pivot pin, securing the disks against removal and a seal on the strap preventing the removal of the strap from the slot of the pivot pin.

3. A record device comprising a supporting bar adapted to be secured to a motor vehicle license plate, a pivot pin extending through the supporting bar, a record disk mounted on the pivot pin, a cover disk having a rearwardly extended annular flange fitted over the record disk and having cut-out portions adapted to accommodate the supporting bar whereby rotary movement of the cover disk is prevented, said cover disk having a cut-out portion through which the record disk may be viewed and marked, and means for sealing the record disk and cover disk on the supporting bar.

NICKOLAUS F. MILLER.